(12) United States Patent
Hu et al.

(10) Patent No.: US 10,778,076 B2
(45) Date of Patent: Sep. 15, 2020

(54) ELECTRIC TOOTHBRUSH AND ITS DRIVE MOTOR

(71) Applicant: Jiankun Hu, Shenzhen, Guangdong (CN)

(72) Inventors: Jiankun Hu, Guangdong (CN); Jianchang Hu, Guangdong (CN); Feiran Hu, Guangdong (CN); Feifan Hu, Guangdong (CN)

(73) Assignee: Jiankun Hu, Shenzhen (CN)

( * ) Notice: Subject to any disclaimer, the term of this patent is extended or adjusted under 35 U.S.C. 154(b) by 156 days.

(21) Appl. No.: 16/096,281

(22) PCT Filed: Apr. 26, 2016

(86) PCT No.: PCT/CN2016/080227
§ 371 (c)(1),
(2) Date: Oct. 24, 2018

(87) PCT Pub. No.: WO2017/185230
PCT Pub. Date: Nov. 2, 2017

(65) Prior Publication Data
US 2019/0140533 A1 May 9, 2019

(51) Int. Cl.
H02K 33/16 (2006.01)
H02K 33/18 (2006.01)
(Continued)

(52) U.S. Cl.
CPC ............. *H02K 33/18* (2013.01); *A61C 17/26* (2013.01); *H02K 1/12* (2013.01); *H02K 33/16* (2013.01);
(Continued)

(58) Field of Classification Search
CPC ........ H02K 1/143; H02K 33/00–33/06; H02K 33/16; A61C 17/34–17/3436; A61C 17/3472; A61C 17/3481
See application file for complete search history.

(56) References Cited

U.S. PATENT DOCUMENTS

2018/0185128 A1* 7/2018 Dai ..................... A61C 17/3418

FOREIGN PATENT DOCUMENTS

CN 101534045 A 9/2009
CN 101554342 A 10/2009
(Continued)

OTHER PUBLICATIONS

International Search Report of PCT Patent Application No. PCT/CN2016/080227 dated Feb. 6, 2017.

*Primary Examiner* — Ramon M Barrera

(57) ABSTRACT

Provided are an electric toothbrush and its drive motor, which comprises a U-shaped magnetic yoke, a rotary output component, a second magnetic yoke and four permanent magnets. The two support legs of the U-shaped yoke are respectively wound with coils, enabling the two leg end faces to generate alternating magnetic poles under the control of circuit. The four permanent magnets are centrosymmetrically disposed about a rotatory central line, the first and the fourth magnet are of the same polarity, the second and the third magnet are of the same polarity; the first and the second magnet are of the opposite polarity, disposed corresponding to the first leg; the third and the fourth magnet are of the opposite polarity, disposed corresponding to the second leg. Under the control of circuit, the driving permanent magnets drive the second yoke and the rotary output component to reciprocatively rotate about the rotatory central line.

10 Claims, 5 Drawing Sheets

(51) Int. Cl.
    *A61C 17/26*     (2006.01)
    *H02K 1/12*     (2006.01)
    *H02K 33/12*     (2006.01)
    *H02K 1/14*     (2006.01)
    *A61C 17/34*     (2006.01)
    *H01F 13/00*     (2006.01)

(52) U.S. Cl.
    CPC ........ *A61C 17/3418* (2013.01); *H01F 13/003* (2013.01); *H02K 1/143* (2013.01); *H02K 33/12* (2013.01)

(56) References Cited

FOREIGN PATENT DOCUMENTS

| | | |
|---|---|---|
| CN | 102202600 A | 9/2011 |
| CN | 203674949 U | 6/2014 |
| CN | 204392053 U | 6/2015 |
| CN | 105471217 A | 4/2016 |

\* cited by examiner

ELECTRIC TOOTHBRUSH AND ITS DRIVE MOTOR

TECHNICAL FIELD

The present disclosure relates to a motor, in particular a motor that can output a reciprocating rotational motion.

FIELD BACKGROUND

An electric motor is an electromagnetic device that converts electrical energy into mechanical energy based on the law of electromagnetic induction. It is widely used in various fields and is an indispensable prime motor for today's society, providing power source for a large number of electrical appliances or machines.

An electric toothbrush is a kind of motor-powered device. At present, the drive motor of electric toothbrush usually includes a mountain-shaped iron-core magnet yoke (also called E-shaped magnet yoke), permanent magnet (one piece or two pieces), and rotary output component, the permanent magnet drives the rotary output component to reciprocatively rotate under the action of a coil mounted on the mountain-shaped iron-core yoke. However, the magnetic flux of the middle support of the mountain-shaped iron-core yoke is large, the magnetic flux of the two ends of the magnetic yoke is small, and the force of the permanent magnet is small; and the housing and the rotary output component are required not to have magnetic conductive material to affect the magnetic circuit. Such kind of electric toothbrush require sufficient torque transmission, and must be guaranteed with spring resonance.

SUMMARY

The disclosure provides a new type of electric toothbrush and a drive motor thereof.

The drive motor provided includes:

a U-shaped magnetic yoke, the U-shaped magnetic yoke has a first support leg and a second support leg, and the first support leg and the second support leg are respectively wound with coils;

a control circuit, the control circuit is electrically connected to the coils and generates alternating pulses, to generate alternating magnetic poles at the end faces of the two support legs of the U-shaped magnetic yoke;

a rotary output component, the rotary output component can reciprocatively rotate about a rotatory central line;

a second magnetic yoke, the second magnetic yoke is disposed at one end of the rotary output component near the U-shaped magnetic yoke; and four permanent magnets, the permanent magnets are fixedly mounted on the second yoke; the four permanent magnets are centrosymmetrically disposed about a rotatory central line, they are a first permanent magnet, a second permanent magnet, a third permanent magnet and a fourth permanent magnet; the outer faces of the first permanent magnet and the fourth permanent magnet are of the same polarity, and the outer faces of the second permanent magnet and the third permanent magnet are of the same polarity; the outer faces of the first permanent magnet and the second permanent magnet are of the opposite polarity and are disposed corresponding to the end face of the first support leg; the outer faces of the third permanent magnet and the fourth permanent magnet are of the opposite polarity and are disposed corresponding to the end face of the second support leg; there is air gap between the end face of the permanent magnet and its corresponding support leg, and under the control of the control circuit, the driving permanent magnets drive the second yoke and the rotary output component to reciprocatively rotate about the rotatory central line.

As a further improvement of the drive motor, the rotatory central line of the rotary output component is perpendicular to the end face of support leg of the U-shaped magnetic yoke, and passes through the symmetrical center point of the end faces of the first leg and the second leg.

As a further improvement of the drive motor, the end face of the first leg and the second leg is inclined face with an inclination angle of $\alpha$, the rotatory central line of the rotary output component is perpendicular to the inclined face.

As a further improvement of the drive motor, the inclination angle $\alpha$ takes a value of $3°\leq\alpha\leq8°$.

As a further improvement of the drive motor, the gap between the first permanent magnet and the second permanent magnet is smaller than the length of the first leg end face in the direction in which the first permanent magnet and the second permanent magnet lie, the gap between the third permanent magnet and the fourth permanent magnet is smaller than the length of the second leg end face in the direction in which the third permanent magnet and the fourth permanent magnet lie.

As a further improvement of the drive motor, the rotary output component comprises a rotating shaft rotatably mounted on a support body; and a resonance component, the resonance component resonates with the rotating shaft during the reciprocal rotation about the rotating shaft, to increase the rotational amplitude and the torque of the rotating shaft.

As a further improvement of the drive motor, the resonance component includes a position limiter that rotates together with the rotating shaft and a resonator with elasticity, and the resonator is disposed on the reciprocal rotation trace of the position limiter, the position limiter causes the resonator to deform when reciprocatively rotating about the rotating shaft.

As a further improvement of the drive motor, the resonance component comprises a position limiter and a resonator with elasticity, the resonator rotates together with the rotating shaft, the position limiter limits the rotation of the resonator, causing the resonator to deform when rotating.

As a further improvement of the drive motor, the rotating shaft comprises a drive shaft and an output shaft, and the drive shaft and the output shaft are fixedly connected by a coupling body.

As a further improvement of the drive motor, an elastic body for absorbing the moment of inertia of the rotating shaft is disposed in the rotating direction of the rotating shaft, and the elastic characteristic of the elastic body is above quadratic curve, and the elastic body is a sphere, an elliptical sphere, a cylinder, an elliptical cylinder, a semicircular silicone or a rubber.

The electric toothbrush provided by the present application, comprises the drive motor of any of the above and a brush head, and the brush head is mounted on the rotary output component of the drive motor.

The driving motor provided by the present application comprises a U-shaped magnet yoke, a rotary output component, a second magnet yoke and four permanent magnets. The two support legs of the U-shaped magnetic yoke are respectively wound with coils, which enable the end faces of the two legs to generate alternating magnetic poles under the control circuit. The four permanent magnets are centrosymmetrically disposed about a rotatory central line, the outer faces of the first permanent magnet and the fourth permanent magnet are of the same polarity, the outer faces of the second permanent magnet and the third permanent magnet are of the same polarity; and the outer faces of the first permanent magnet and the second permanent magnet are of the opposite polarity and are disposed corresponding to the first leg; the outer faces of the third permanent magnet and the fourth permanent magnet are of the opposite polarity and are disposed corresponding to the second leg. Under the control of control circuit, the driving permanent magnets drive the second yoke and the rotary output component to reciprocatively rotate about the rotary central line. The design of the U-shaped yoke corresponding to four permanent magnets and the second magnetic yoke is different from the prior art, it's torque is larger than that of the existing motor of the same power, the magnetic flux is large, and the driving power is correspondingly reduced.

DETAILED DESCRIPTION

Embodiment 1

The first embodiment provides a drive motor that can output a reciprocating rotational motion.

Figure 1:
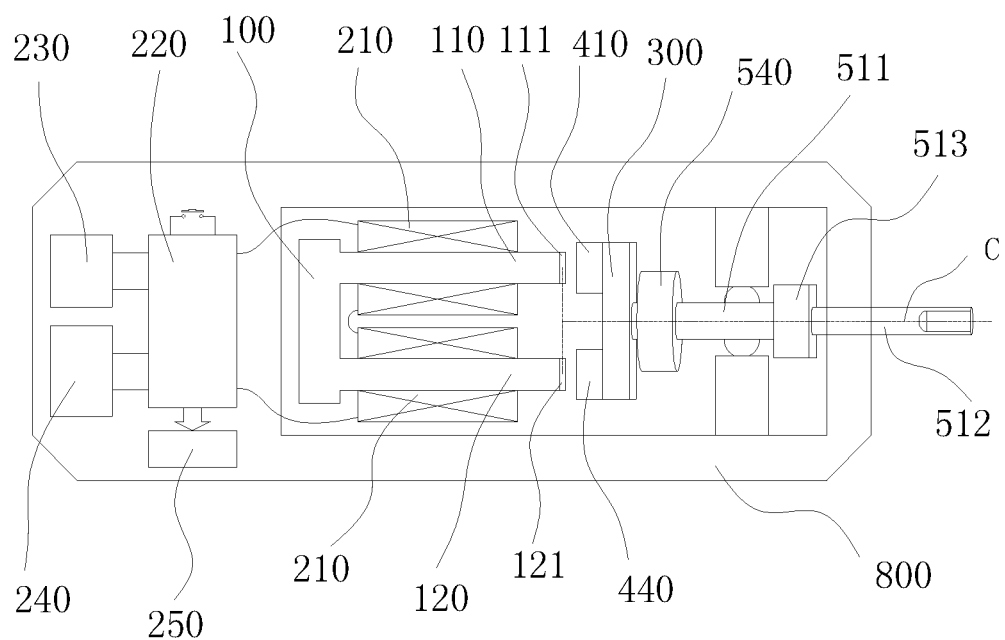
FIG. 1 is a structural schematic diagram of an embodiment of the drive motor for electric toothbrush of the present application.
Figure 2:
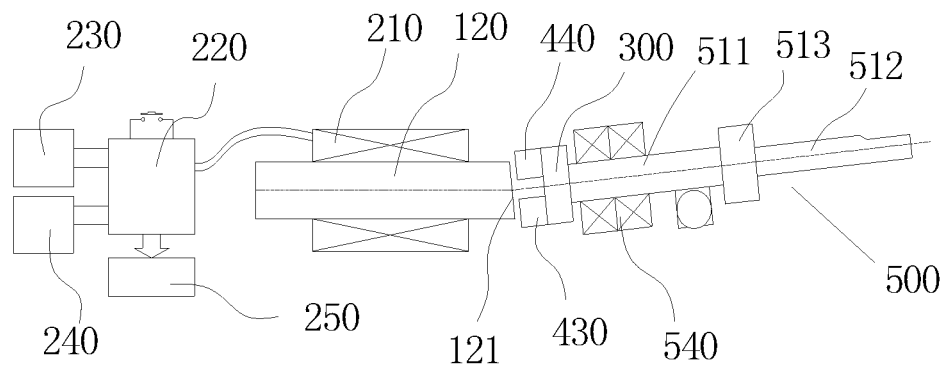
FIG. 2 is a side view of the embodiment shown in FIG. 1.
Figure 5:
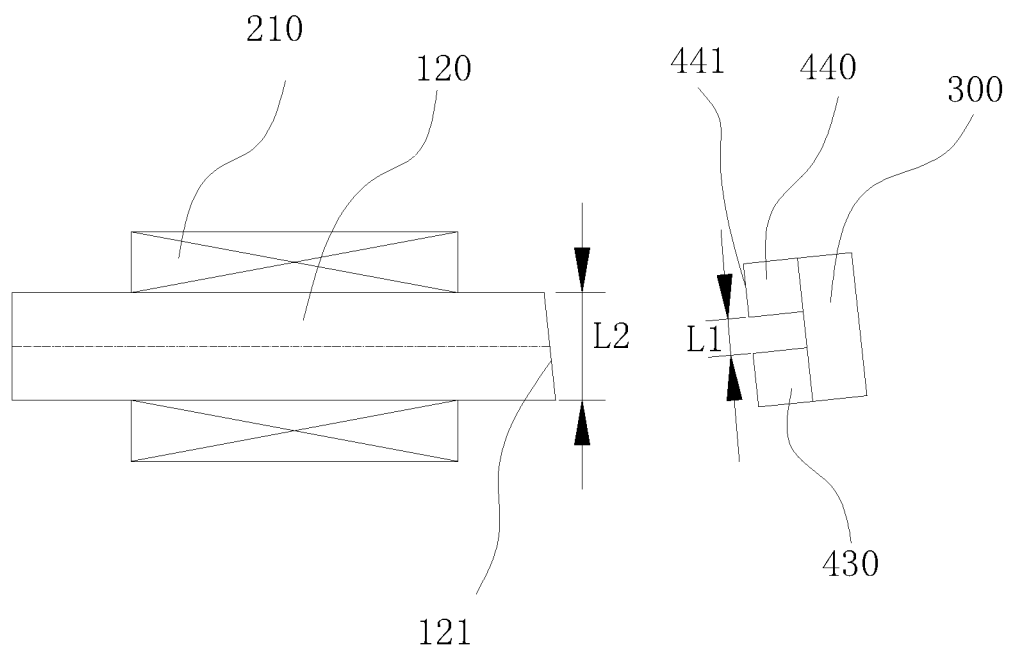
FIG. 5 is a schematic view showing the distance between the permanent magnets and the length of the corresponding support leg of the embodiment shown in FIG. 1.

Referring to FIGS. 1 and 2, the drive motor comprises:

a U-shaped magnetic yoke 100, the U-shaped magnetic yoke 100 has a first support leg 110 and a second support leg 120, and the first support leg 110 and the second support leg 120 are respectively wound with coils 210;

a control circuit 220, the control circuit 220 is electrically connected to the coils 210 and generates alternating pulses, to generate alternating magnetic poles at the end faces 111, 121 of the two support legs of the U-shaped magnetic yoke 100;

a rotary output component 500, the rotary output component 500 can reciprocatively rotate about a rotary central line C;

a second magnetic yoke 300 (to distinguish it from the U-shaped yoke 100, it is called second yoke), the second magnetic yoke 300 is disposed at one end of the rotary output component 500 near the U-shaped magnetic yoke 100; and four permanent magnets, the permanent magnets are fixedly mounted on the second yoke 300; the four permanent magnets are centrosymmetrically disposed about a rotatory central line C, they are a first permanent magnet 410, a second permanent magnet 420, a third permanent magnet 430 and a fourth permanent magnet 440; the outer faces of the first permanent magnet 410 and the fourth permanent magnet 440 (the outer faces of the fourth permanent magnet 440 is the end surface of 441 shown in FIG. 5, and the outer faces of the other permanent magnets are the same as the fourth permanent magnet 440, which will not be shown in the figure) are of the same polarity, and the outer faces of the second permanent magnet 420 and the third permanent magnet 430 are of the same polarity; the outer faces of the first permanent magnet 410 and the second permanent magnet 420 are of the opposite polarity and are disposed corresponding to the end face 111 of the first support leg 110; the outer faces of the third permanent magnet 430 and the fourth permanent magnet 440 are of the opposite polarity and are disposed corresponding to the end face 121 of the second support leg 120; there is air gap between the end face of the permanent magnet and its corresponding support leg, and under the control of the control circuit 220, the driving permanent magnets 410, 420, 430 and 440 drive the second yoke 300 and the rotary output component 500 to reciprocatively rotate about the rotatory central line C.

Figure 3:
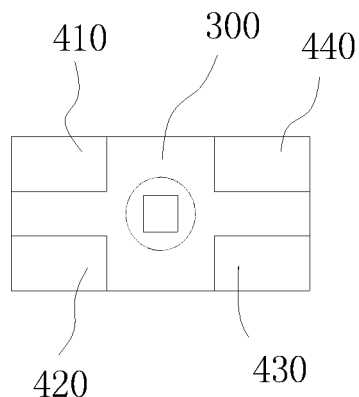
FIG. 3 is a schematic view showing the distribution of four permanent magnets in the embodiment shown in FIG. 1.

Referring to FIG. 3, the four permanent magnets 410, 420, 430, 440 may be arranged in a rectangular shape centrosymmetrically around the rotatory central line C. The horizontal distance between the first permanent magnet 410 and the fourth permanent magnet 440 is equal to the horizontal distance between the second permanent magnet 420 and the third permanent magnet 430, and the vertical distance between the first permanent magnet 410 and the second permanent magnet 420 is equal to the vertical distance between the fourth permanent magnet 440 and the third permanent magnet 430.

The U-shaped magnetic yoke 100, the second magnetic yoke 300, the rotary output component 500 and the permanent magnets are mounted within a housing 800, wherein the rotary output component 500 is rotatably mounted within the housing 800. The housing 800 referred to herein may be a housing dedicated to the motor or a housing of an electric appliance using the motor.

When energized, each leg of the U-shaped yoke 100 corresponds to two permanent magnets, ensuring that the torque is sufficiently large to realize the entire reciprocating swing process without external force. The design of the U-shaped yoke corresponding to four permanent magnets and the second magnetic yoke is different from the prior art, which makes the torque of the drive motor larger than that of the existing motor of the same power, the magnetic flux is large, and the driving power is correspondingly reduced.

Specifically, referring to FIGS. 1, 2, and 3, it is assumed that the end faces of the first permanent magnet 410 and the fourth permanent magnet 440 are N poles, and the end faces of the second permanent magnet 420 and the third permanent magnet 430 are S poles. When the coil 210 is energized, if the end face of the first leg 110 is N pole and the end face of the second leg 120 is S pole, the N pole of the first leg 110 will create a suction force F2 to the S pole of the second permanent magnet 420, and a repulsive force F1 to the N pole of the first permanent magnet 410. Similarly, the S pole of the second leg 120 will generate a suction force F4 to the N pole of the fourth permanent magnet 440 and a repulsive force F3 to the S pole of the third permanent magnet 430, thereby rotating the rotary output component 500 clockwise, as shown in FIG. 3. Then the total torque of the rotary output component is (F1+F2+F3+F4)·force radius, and the force radius is the distance from the magnetic force to the center of rotation.

When the current direction in the coils 210 changes, if the end face of the first leg 110 is S pole, and the end face of the second leg 120 is N pole, the S pole of the first leg 110 will create a repulsive force to the S pole of the second permanent magnet 420, and a suction force to the N pole of the first permanent magnet 410. Similarly, the N pole of the second leg 120 will create a repulsive force to the N pole of the fourth permanent magnet 440, and generate a suction force to the S pole of the third permanent magnet 430, thereby rotating the rotary output component 500 counterclockwise, as shown in FIG. 3.

In summary, the coils 210 are connected to the control circuit 220, and the control circuit 220 generates an alternating pulse with adjustable pulse width, so that the end face of the U-shaped yoke 100 generates alternating magnetic poles, so that the permanent magnet generate suction torque and repulsive torque, or repulsive torque and suction torque, driving the rotary output component 500 to reciprocatively rotate, the corresponding mechanical units are thereby driven to reciprocatively rotate by the rotary output component 500.

In the power-off state, the first and second permanent magnets 410, 420 and the first support leg 110 form a closed magnetic path through the air gap, and the third and fourth permanent magnets 430, 440 and the second leg 120 form a closed magnetic path through the air gap, to avoid magnetic leakage. Moreover, the permanent magnet and the second yoke 300 are mounted on the rotary output component 500, so that other portions of the rotary output component 500 do not affect the magnetic field, that is, other portions of the rotary output component will not affect the magnetic circuits even if there is permeability magnetic material.

Further, the end faces 111, 121 of the first support leg 110 and the support second leg 120 are inclined faces with an inclination angle of α, and the rotatory central line C of the rotary output component 500 is perpendicular to the inclined face.

Figure 4:
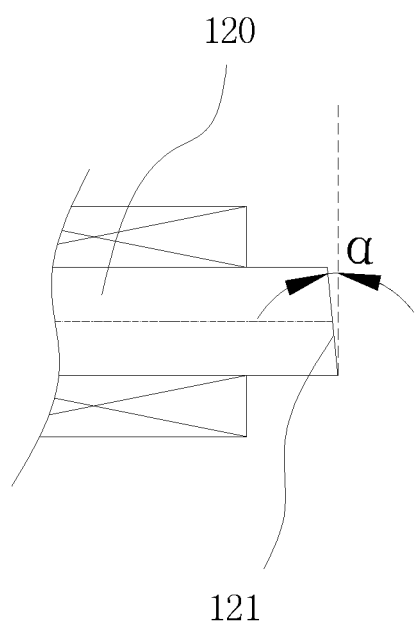
FIG. 4 is a schematic view showing the inclined end surface of the U-shaped magnet yoke of the embodiment shown in FIG. 1.

The inclination angle α is shown in FIG. 4, which is an angle formed by the leg end face 121 and the vertical plane in the orientation shown in FIG. 4.

Further, the inclination angle range can be set to be $3° \leq \alpha \leq 8°$. Similarly, as rotatory central line C of the rotary output component 500 is perpendicular to the inclined face, the rotary output component 500 is also inclined by 3-8°, which ensures that the electric toothbrush conforms with ergonomics when in use, and is convenient for user to clean mouth.

The U-shaped yoke 100 can be formed by stamping and laminating a silicon steel sheet, and then cutting into an inclined end surface by water cutting or laser cutting process.

Further, the gap between the first permanent magnet 410 and the second permanent magnet 420 may be smaller than the length of the end face 111 of the first support leg 110 in the direction in which the first permanent magnet 410 and the second permanent magnet 420 lie, and the gap between the third permanent magnet 430 and the fourth permanent magnet 440 may be smaller than the length of the end face 121 of the second leg 120 in the direction in which the third permanent magnet 430 and the fourth permanent magnet 440 lie. In order to ensure that the legs of the U-shaped yoke 100 have sufficient force for all the permanent magnets.

Referring to FIG. 5, taking the third permanent magnet 430 and the fourth permanent magnet 440 as an example, the gap between the third permanent magnet 430 and the fourth permanent magnet 440 refers to the distance L1 shown in FIG. 5, and the length of the end face of the second leg 120 in the direction in which the third permanent magnet 430 and the fourth permanent magnet 440 lie refers to the distance L2 shown in FIG. 5.

Referring to FIG. 1, the width between the first permanent magnet 410, the second permanent magnet 420, the third permanent magnet 430, the fourth permanent magnet 440 and each other may be greater than the width between the first leg 110 and the second leg 120, also for ensuring that the legs of the U-shaped yoke 100 have sufficient force for each permanent magnet. The width is the distance in the vertical direction shown in FIG. 1.

Referring to FIG. 1, the rotary output component 500 can include a rotating shaft that is rotatably mounted on a support body. As shown in FIG. 1, the support body may be a support bearing 540, or may be other structures that can support the rotating shaft being rotatably mounted, such as a spring support structure.

The rotating shaft may be an integrally-formed shaft structure or it may be a combination of multiple parts. Referring to FIGS. 1 and 2, in the present embodiment, the rotating shaft includes a drive shaft 511 and an output shaft 512, the drive shaft 511 and the output shaft 512 are fixedly connected by a coupling body 513. This structure facilitates the addition of other structures on the rotating shaft and reduces the processing difficulty.

In addition, the drive motor further includes a resonance component. During the reciprocal rotation of the rotating shaft, the resonance component resonates with the rotating shaft to increase the rotational amplitude and the torque of the rotating shaft.

The resonance component may include a position limiter that rotates together with the rotating shaft and a resonator with elasticity, and the resonator is disposed on the reciprocal rotation trace of the position limiter, the position limiter causes the resonator to deform when reciprocatively rotating about the rotating shaft. The position limiter can be disposed on the coupling body to reduce the processing difficulty.

Figure 6:
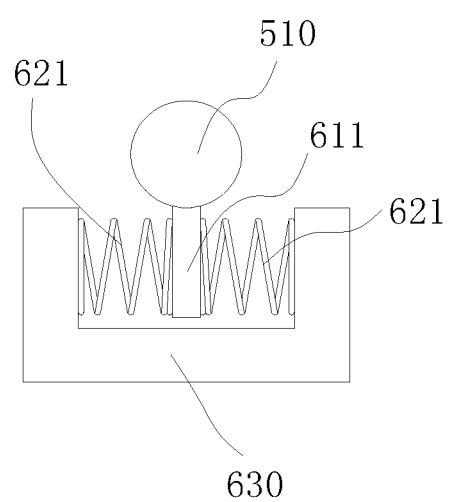
FIG. 6 is a structural schematic diagram of the resonator in the drive motor of the first embodiment of the present application.

As shown in FIG. 6, two springs 621 are disposed in a mounting seat 630. The position limiter 611 is a plate-like structure that presses the springs 621 as the rotating shaft 510 reciprocates, causing the springs 621 to resonate with the rotating shaft 510. Thereby, the rotational amplitude and the torque of the rotating shaft 510 are further increased.

The rotating shaft 510 referred to herein is an illustration, its specific structure may be a combination of the drive shaft 511, the output shaft 512 and the coupling body 513, or may be an integrally-formed shaft structure.

Figure 7:
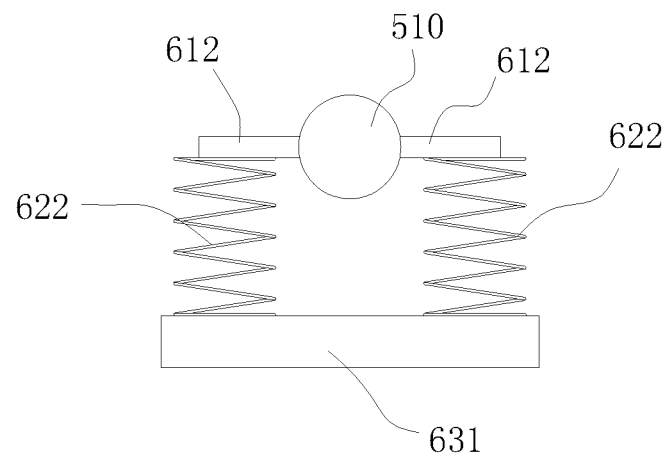
FIG. 7 is a structural schematic diagram of the resonator in the drive motor of the second embodiment of the present application.

As shown in FIG. 7, the springs 622 may also be fixed on a bottom plate 631. The position limiter 612 is a two-plate structure, the two plates are disposed on two sides of the rotating shaft 510 and respectively press their corresponding springs 622, they press the springs 622 when reciprocatively rotating about the rotating shaft 510, causing the spring 622 to resonate with the rotating shaft 510.

The resonance component may include a position limiter and a resonator with elasticity, the resonator rotates together with the rotating shaft, and position limiter limits the rotation of the resonator, causing the resonator to deform when rotating.

Figure 8:
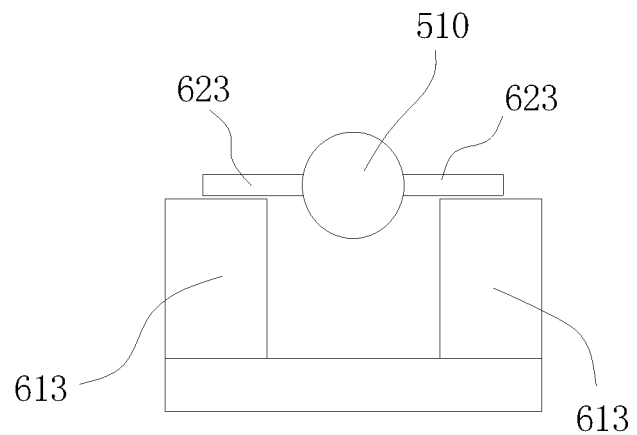
FIG. 8 is a structural schematic diagram of the resonator in the drive motor of the third embodiment of the present application.

As shown in FIG. 8, the resonator is made of two spring plates 623, which are disposed on two sides of the rotating shaft 510, and the two position limiters 613 are respectively located below the corresponding spring plates 623. When the spring plates 623 rotate together with the rotating shaft 510, the position limiters 613 limit the rotation of the spring plates 623, causing the spring plates 623 to deform when rotating, and resonate with the rotating shaft 510.

Figure 9:
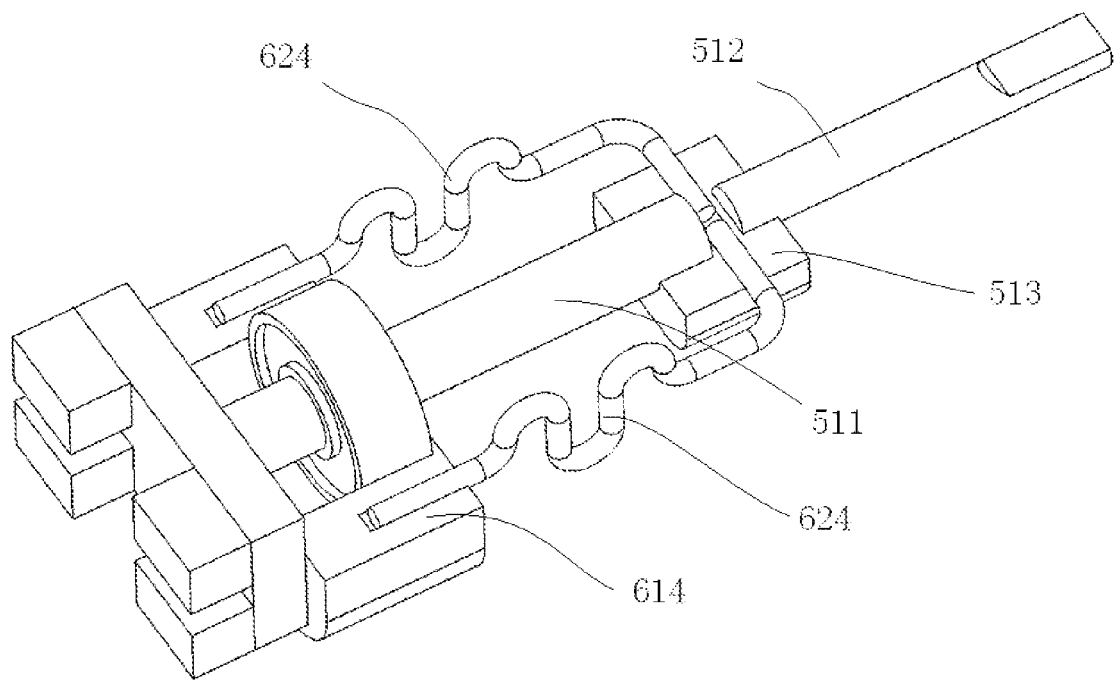
FIG. 9 is a structural schematic diagram of the resonator in the drive motor of the fourth embodiment of the present application.

As shown in FIG. 9, the resonator is made of one piece or two pieces of spring 624, which is (are) disposed on one side or both sides of the rotating shaft 510 respectively, and a position limiter 614 is disposed on the support body or the housing. One end of the spring 624 is fixed to the coupling body 513, and the other end is fixed to the position limiter 614. When the spring(s) 624 rotate(s) together with the rotating shaft 510, the position limiter 614 limits the rotation of the spring 624, causing the spring 624 to deform when rotating, and resonate with the rotating shaft 510.

Further, an elastic body for absorbing the moment of inertia of rotating shaft is disposed in the rotating direction of the rotating shaft, and the elastic characteristic of the elastic body is above quadratic curve, the elastic body is a sphere, an elliptical sphere, a cylinder, an elliptical cylinder, a semi-circular silicone or a rubber.

Figure 10:
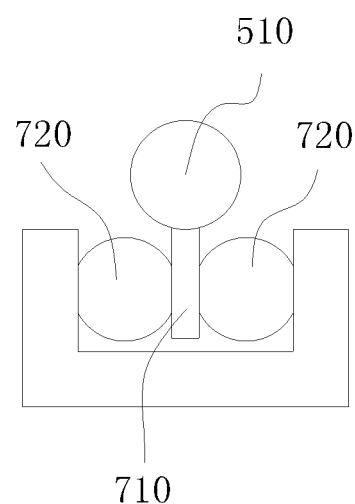
FIG. 10 is a structural schematic diagram of an embodiment of an elastic body for absorbing the moment of inertia of rotating shaft in the drive motor of the present application.

Specifically, referring to FIG. 10, a linkage 710 is fixed on the rotating shaft 510. The linkage 710 is located between the two elastic bodies 720. The position limiter rotates with the rotating shaft to press the elastic bodies 720.

The elastic body 720 is mainly used for absorbing the moment of inertia of the rotary output component 500 under no-load condition. With the increase of the compression stroke, the elastic force is small before the position is reached, and it is rapidly increased when the position is fast. The elastic force increases with the compression stroke, and the elastic force is small before the position is reached. The elastic characteristics of the elastic body 720 can ensure that the elastic body 720 does not have excessive influence on the rotation of the rotary output component 500 under load (the rotation of the rotary output component 500 is attenuated under load). Only when the rotary output component 500 excessively presses the elastic bodies 720 under no-load condition will a large restoring force be generated.

Referring to FIG. 1, a rechargeable battery 230 and a charging module 240 may be further included. The rechargeable battery 230 is used for power supply, and the charging module 240 is connected to the control circuit for charging the rechargeable battery 230.

The control circuit may further include a status indication module 250 for indicating operating state of the motor, and a switch for triggering a signal to the control circuit, to control the motor on and off.

Further, the control circuit 220 can determine the frequency of mechanical oscillations by counting the energization pulses of the coils, the output signal gives a corresponding indication to the operating condition of the mechanical unit.

In addition to driving the electric toothbrush, the drive motor shown in this embodiment can also drives various mechanical units that require reciprocating rotational motion.

Embodiment 2

The second embodiment provides an electric toothbrush. The electric toothbrush comprises a drive motor and a brush head, the drive motor can output a reciprocating rotational motion to drive the brush head to reciprocate and oscillate, thereby achieving oral cleaning.

The drive motor can employ the drive motor structures shown in any of the above embodiments, wherein the brush head is mounted on the rotary output component 500 of the drive motor, for example, on the output shaft 512.

The above is a further detailed description of the present disclosure combined with the specific embodiments, however, the specific embodiments of the present invention are not limited to the description. For those skilled in the art, several simple derivations or substitutions can be made without departing from the inventive concept.

What is claimed is:

1. A drive motor for electric toothbrush, comprising:
   a U-shaped magnetic yoke, the U-shaped magnetic yoke has a first support leg and a second support leg, and the first support leg and the second support leg are respectively wound with coils;
   a control circuit, the control circuit is electrically connected to the coils and generates alternating pulses, to generate alternating magnetic poles at the end faces of the two support legs of the U-shaped magnetic yoke;
   a rotary output component, the rotary output component can reciprocatively rotate about a rotatory central line;
   a second magnetic yoke, the second magnetic yoke is disposed at one end of the rotary output component near the U-shaped magnetic yoke; and
   four permanent magnets, the permanent magnets are fixedly mounted on the second yoke; the four permanent magnets are centrosymmetrically disposed about a rotatory central line, they are a first permanent magnet, a second permanent magnet, a third permanent magnet and a fourth permanent magnet; the outer faces of the first permanent magnet and the fourth permanent magnet are of the same polarity, and the outer faces of the second permanent magnet and the third permanent magnet are of the same polarity; the outer faces of the first permanent magnet and the second permanent magnet are of the opposite polarity and are disposed corresponding to the end face of the first support leg; the outer faces of the third permanent magnet and the fourth permanent magnet are of the opposite polarity and are disposed corresponding to the end face of the second support leg; there is air gap between the end face of the permanent magnet and its corresponding support leg, and under the control of the control circuit, the driving permanent magnets drive the second yoke and the rotary output component to reciprocatively rotate about the rotatory central line.

2. The drive motor of claim 1, wherein the rotatory central line of the rotary output component is perpendicular to the end face of support leg of the U-shaped magnetic yoke, and passes through the symmetrical center point of the end faces of the first leg and the second leg.

3. The drive motor of claim 1, wherein the end face of the first leg and the second leg is inclined face with an inclination angle of a, the rotatory central line of the rotary output component is perpendicular to the inclined face.

4. The drive motor of claim 3, wherein the inclination angle α takes a value of $3°\leq\alpha\leq8°$.

5. The drive motor of claim 1, wherein the gap between the first permanent magnet and the second permanent magnet is smaller than the length of the first leg end face in the direction in which the first permanent magnet and the second permanent magnet lie, the gap between the third permanent magnet and the fourth permanent magnet is smaller than the length of the second leg end face in the direction in which the third permanent magnet and the fourth permanent magnet lie.

6. The drive motor of claim 1, wherein the rotary output component comprises a rotating shaft rotatably mounted on a support body; and a resonance component, the resonance component resonates with the rotating shaft during the reciprocal rotation about the rotating shaft, to increase the rotational amplitude and the torque of the rotating shaft.

7. The drive motor of claim 6, wherein the resonance component includes a position limiter that rotates together with the rotating shaft and a resonator with elasticity, and the resonator is disposed on the reciprocal rotation trace of the position limiter, the position limiter causes the resonator to deform when reciprocatively rotating about the rotating shaft.

8. The drive motor of claim 6, wherein the resonance component comprises a position limiter and a resonator with elasticity, the resonator rotates together with the rotating shaft, the position limiter limits the rotation of the resonator, causing the resonator to deform when rotating.

9. The drive motor of claim 6, wherein the rotating shaft comprises a drive shaft and an output shaft, and the drive shaft and the output shaft are fixedly connected by a coupling body.

10. An electric toothbrush, comprising the drive motor of claim 1 and a brush head, and the brush head is mounted on the rotary output component of the drive motor.

\* \* \* \* \*